Oct. 23, 1962 D. SAINT 3,059,725
SPRING MOTORS
Filed Nov. 13, 1959 3 Sheets-Sheet 1
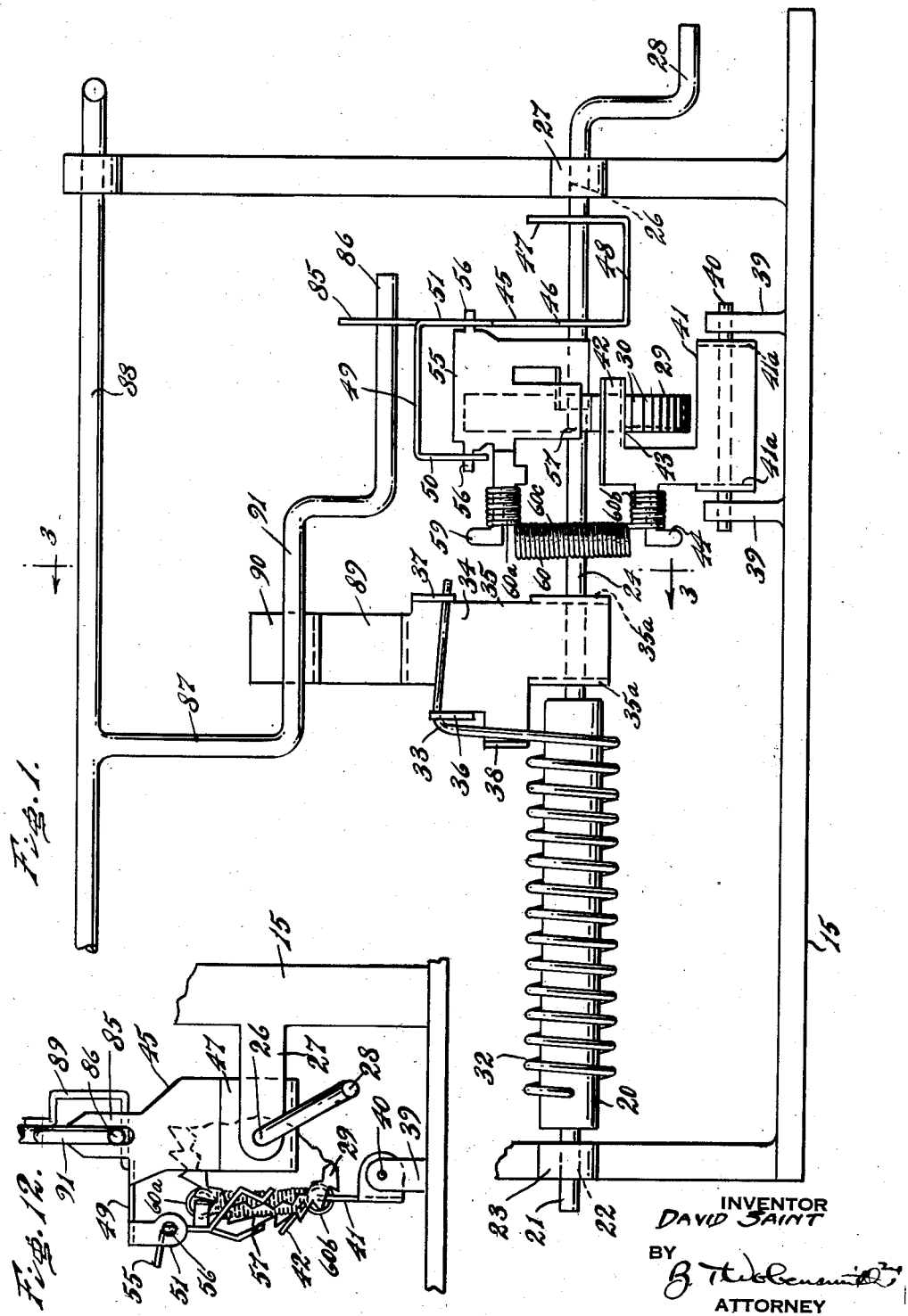
INVENTOR
DAVID SAINT
BY
ATTORNEY Oct. 23, 1962 D. SAINT 3,059,725
SPRING MOTORS
Filed Nov. 13, 1959 3 Sheets-Sheet 2
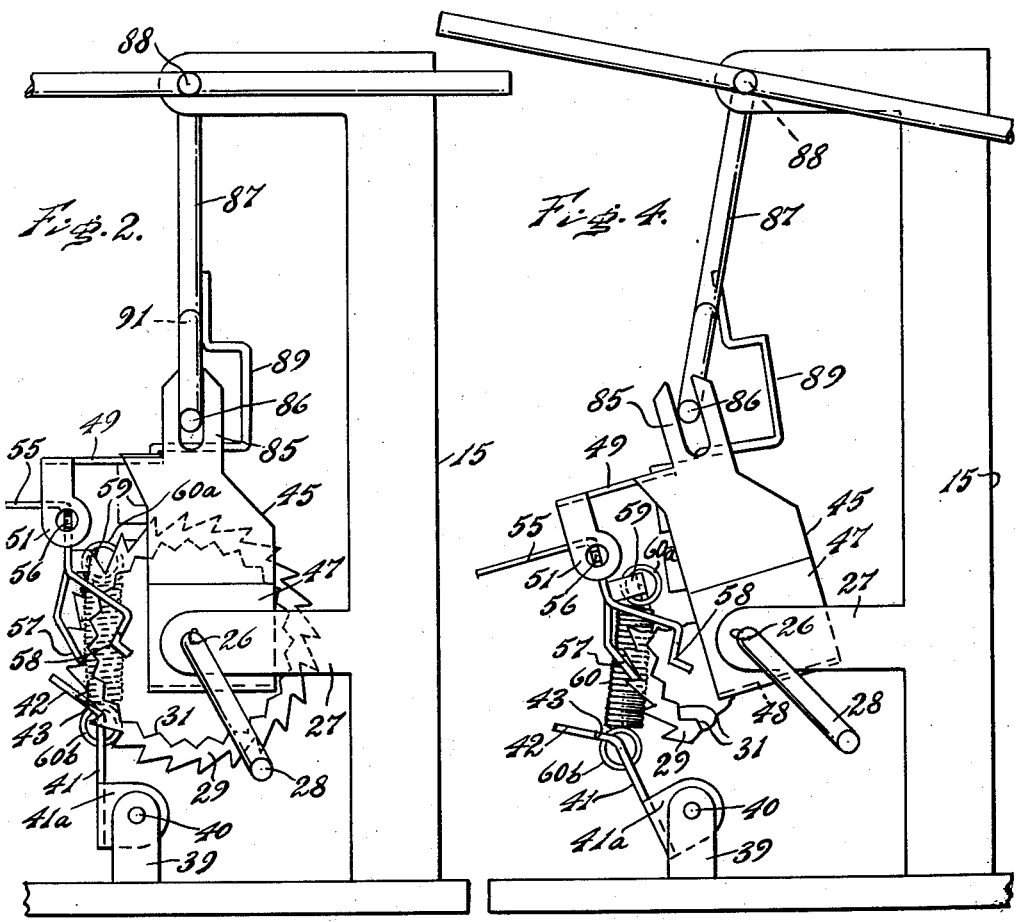
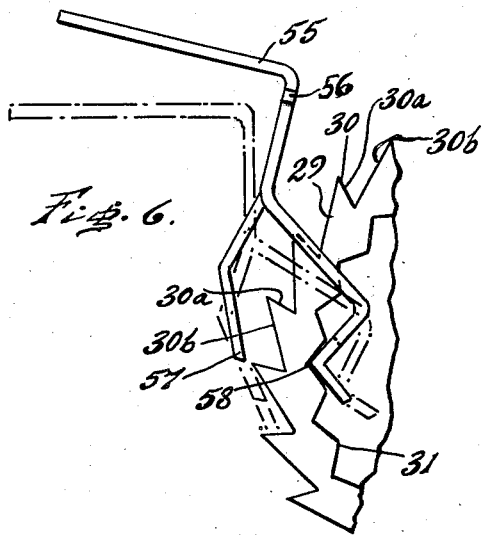
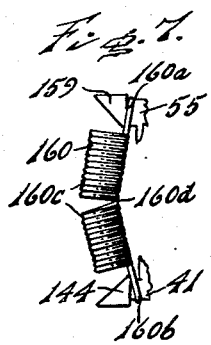
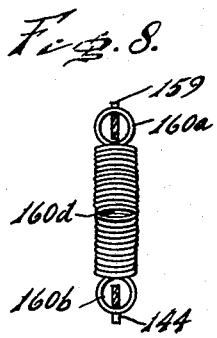
INVENTOR
DAVID SAINT
BY
B. T. Wolkensmith
ATTORNEY Oct. 23, 1962     D. SAINT     3,059,725
SPRING MOTORS
Filed Nov. 13, 1959     3 Sheets-Sheet 3
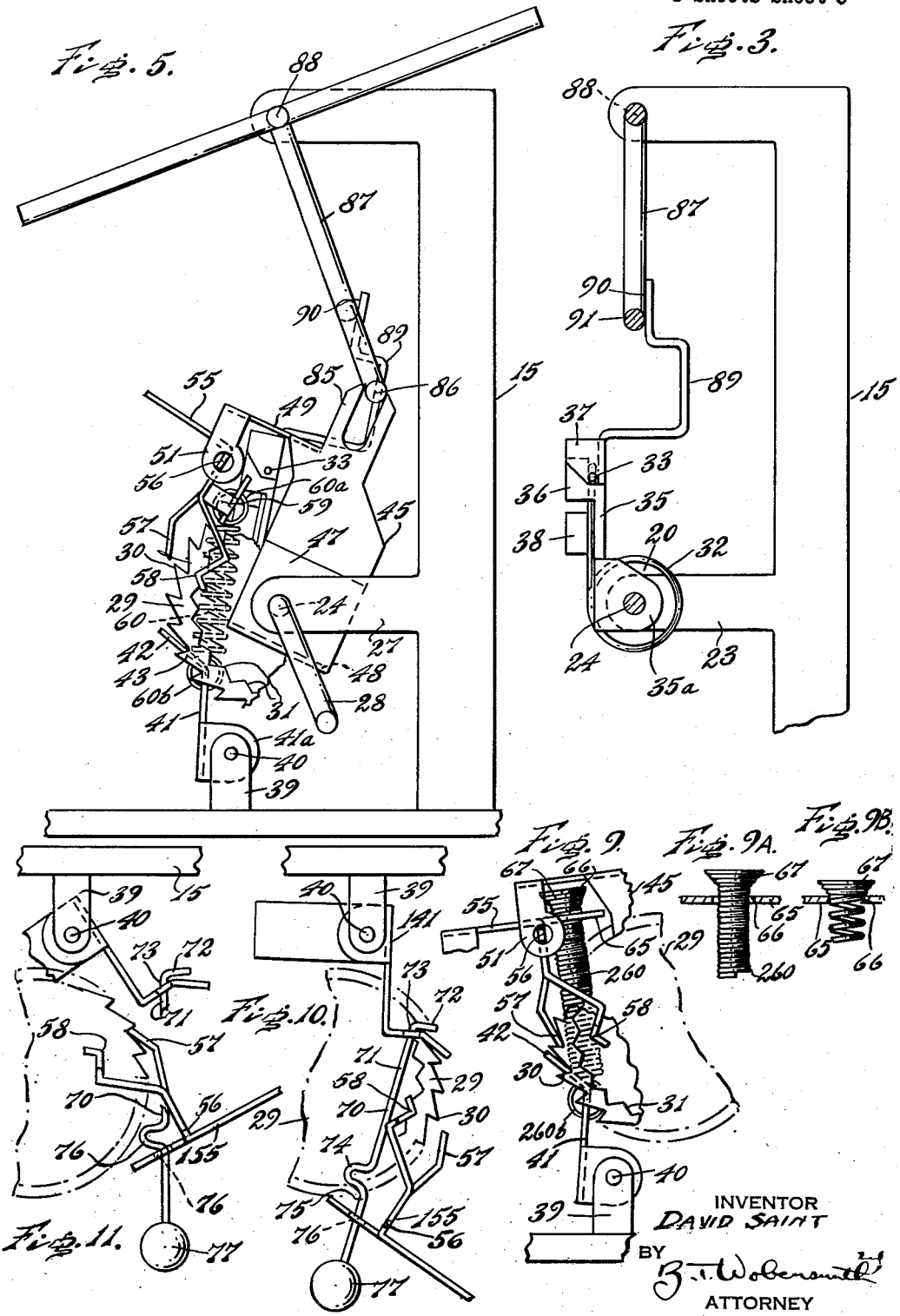
INVENTOR
DAVID SAINT

United States Patent Office 3,059,725
Patented Oct. 23, 1962

3,059,725
SPRING MOTORS
David Saint, Rockledge, Pa., assignor to Graco Metal Products, Inc., Philadelphia, Pa., a corporation of Pennsylvania
Filed Nov. 13, 1959, Ser. No. 852,658
13 Claims. (Cl. 185—37)

This invention relates to spring motors, and more particularly to spring motors having a simple escapement of improved type. This application is a continuation in part of prior application Serial No. 742,272, filed June 16, 1958, now Patent No. 2,998,612 and prior application Serial No. 742,853, filed June 18, 1958.

The principal object of the present invention is to provide a spring motor which is reliable in operation and free from likelihood of failure in use.

It is a further object of the present invention to provide a spring motor that is capable of providing power with a constant force in opposite directions.

It is a further object of the present invention to provide a spring motor having a simple escapement which requires only one power controller or actuator.

It is a further object of the present invention to provide a spring motor having a simple escapement of improved type with a single spring that acts as a lever and is both extensible and compressible.

It is a further object of the present invention to provide a spring motor which is capable of operation in any disposition in one or more forms.

It is a further object of the present invention to provide an improved escapement which is useful for the operation of doll swings, cradles and other devices.

Other objects and advantageous features of the invention will be apparent from the description and claims.

The nature and characteristic features of the invention will be more readily understood from the following description, taken in connection with the accompanying drawings forming part thereof, in which:

FIGURE 1 is a side elevational view of a spring motor in accordance with the invention;

FIG. 2 is a front elevational view of the spring motor as seen from the right of FIG. 1 in one operating position;

FIG. 3 is a vertical sectional view taken approximately on the line 3—3 of FIG. 1;

FIG. 4 is a front elevational view similar to FIG. 2 showing the spring motor in another operating position;

FIG. 5 is a front elevational view similar to FIG. 2 showing the spring motor in another operating position;

FIG. 6 is an enlarged fragmentary side elevational view showing operating positions of the pawl;

FIG. 7 is a side elevational view of another form of actuator, and mounting therefor;

FIG. 8 is an end elevational view of the actuator shown in FIG. 7;

FIG. 9 is a fragmentary elevational view similar to FIG. 2 showing another type of actuator;

FIG. 9A is a view of a portion of FIG. 9 showing the same operating position of the actuator spring;

FIG. 9B is another view of a portion of FIG. 9 showing a different operating position of the actuator spring;

FIG. 10 is a fragmentary sectional view similar to FIG. 5 showing another type of actuator in one operating position;

FIG. 11 is a fragmentary sectional view showing the actuator of FIG. 10 in another operating position; and FIG. 12 is a fragmentary sectional view, similar to FIG. 2, but on a smaller scale and showing another operating position.

It should, of course, be understood that the description and drawings herein are illustrative merely, and that various modifications and changes can be made in the structure disclosed without departing from the spirit of the invention.

Like numerals refer to like parts throughout the several views.

The spring motor in accordance with the invention, in its various embodiments, includes a spring mandrel, with a power spring carried thereon and an escapement mechanism for the controlled application of power to a device to be operated such as a swing, cradle or the like.

Referring now more particularly to the drawings, a frame 15 is provided with a spring mandrel 20 mounted therein. The mandrel 20 is preferably made of wood and has a pin 21 in engagement with one end thereof. The pin 21 is journaled in an opening 22 in a bracket arm 23, forming part of the frame 15. The other end of the spring mandrel 20 has a shank 24 extending thereinto and in engagement therewith.

The shank 24 is rotatably supported in an opening 26 in a bracket arm 27, forming part of the frame 15, and has a crank 28 on the outer end thereof for winding.

The shank 24 has a cup shaped ratchet wheel 29 secured thereto for rotation with the mandrel 20. The ratchet wheel 29 preferably has exterior teeth 30 with inclined faces 30a and 30b, and interior teeth 31.

The mandrel 20 has one end of a helical power spring 32 secured thereto, the other end of the power spring 32 having a hooked portion 33 engaging a wall portion 34 of a driving frame 35 and held by bent over retaining tongues 36 and 37 and by an inbent portion 38 of the wall portion 34 of the frame 35. The driving frame 35 is pivotally mounted on the shank 24 by mounting ears 35a. All the turns of the spring 32 are of larger diameter in unwound condition than the exterior diameter of the mandrel 20.

The frame 15 is provided with spaced projections 39 with a shaft 40 for pivotally mounting a dog 41 by mounting ears 41a. The dog 41 has an arm portion 42 which has an inner edge 43 which is adapted for ratchet engagement. The arm portion 42 is bent at an angle with respect to the main portion of the dog 41 to permit the teeth of the ratchet wheel 29 to move dog 41 outwardly upon movement of the ratchet wheel in a counterclockwise direction as seen in FIG. 4. In the inward position of the dog 41 the edge 43 engages at the root of one of the teeth 30 of the ratchet wheel 29. (See FIG. 5.)

One side portion of the dog 41 has a spring receiving hook 44 formed therein as shown in FIG. 1.

A ratchet frame or carrier bracket 45 is provided (see FIGS. 1 and 2) swingably mounted on the shank 24 with spaced bracket plates 46 and 47 connected by a plate 48. The bracket plate 46 has a plate 49 extending therefrom with spaced downwardly extending bracket arms 50 and 51 which assembly forms a mounting for a pawl 55. The pawl 55 has opposite pivot pins 56 thereon for pivotal engagement in the bracket arms 50 and 51. The pawl 55 is provided with a tongue 57 for engagement of the teeth 30 of the ratchet wheel 29. The pawl 55 has a spring receiving hook 59 for attachment of a spring 60. The pawl 55 has an inner control finger 58 bent at an angle so as to be actuated by the teeth 31 to serve as a safety device when the normal escapement action fails, and upon much faster than normal movement of the ratchet wheel 29 which impels by momentum the pawl finger 58 inwardly as seen in FIG. 6 to engage the tongue 57.

Referring first to FIGS. 1, 2, 4 and 5, the spring 60 as there shown is preferably formed as a helical spring and with a plurality of turns 60a for engagement over the hook 59 of the pawl 55, a plurality of turns 60b for engagement over the hook 44 of the dog 41, and an intermediate portion 60c having a plurality of helical turns with initial tension and acting in tension with the turns of the portion 60c separated, or acting in compression with the respective turns of the portion 60c abutting and buckling by reason of the force application offset to the periphery of the coils of the spring portion 60c.

The spring 60, in compression urges the tongue portion of the pawl 55 into engagement with one of the teeth 30 of the ratchet wheel 29 and the edge 43 of the dog 41 out of tooth engagement. In tension, the spring 60 urges edge 43 of the dog 41 into engagement with one of the teeth 30 of the ratchet wheel 29 and at the same time urges the tongue portion 57 of the pawl 55 out of ratchet tooth engagement.

Referring now more particularly to FIGS. 7 and 8 of the drawings in which an alternative form of actuator is illustrated, the dog 41 has a different type of hook 144 for engagement with a terminal end ring 160b of a spring 160, the pawl 55 having a similar spring receiving hook 159 for engagement with a terminal end ring 160a. The spring 160 includes a plurality of turns 160c connected by a central bent section 160d to provide a permanent intermediate deformation in the spring 160. The spring 160 will function in tension in a manner similar to the spring 60, but upon compression will bend at the central section 160d while still applying a resilient compressive force between the hook 144 and the hook 159.

Referring now more particularly to FIGS. 9, 9A and 9B, the actuator spring shown at 260 has its lower end 260b connected as before to the hook 44 of the dog 41, the pawl 55 having an extension 65 with an opening 66 therethrough. The spring 260 is provided with an enlarged head 67 which is movable upon tension into engagement (see FIG. 9B) with the extension 65 and upon compressive action thereon, the head 67 moves clear of the extension 65 (see FIGS. 9 and 9A).

Referring now to FIGS. 10 and 11, in place of the resilient actuator or spring 60, 160 or 260, a weight actuated connector 70 may be employed. The dog 141, as illustrated in FIGS. 10 and 11, is located above the mandrel 20 and the pawl 155 is located below the mandrel 20. The connector 70 includes a connecting link having an upper hooked end 72 slidably mounted in an opening 73 in the dog 141, has a bent portion 74 acting as a stop, and a portion 75 extending through an opening 76 in a plate on the pawl 155. The link 71 has a weight 77 carried thereon tending to urge the lower end of the link 71 downwardly. The pawl 155 is provided with a control finger 58 as before.

The carrier bracket 45 has an upwardly extending slotted driving arm 85 for the reception of an offset portion 86 of a driving arm 87 connected to a rocker shaft 88.

The driving frame 35 has a driving plate 89 having an upper driving face 90 for engagement with an intermediate portion 91 of the driving arm 87.

The mode of operation will now be pointed out.

The power spring 32 is wound onto the mandrel 20 by turning the winding crank 28 in a counterclockwise direction (as seen in FIGS. 2, 4 and 5). The power spring 32 is effective for imparting a turning force or turning forces onto the mandrel 20 to actuate the rocker shaft 88. An oscillating movement of the rocker shaft 88 is effected by reason of the escapement provided by the pawl 55 and the dog 41.

As hereinafter more fully pointed out, a power impulse or force is imparted upon clockwise movement of the carrier bracket 45 and a secondary power arm is to be employed to which one end of the power spring 32 is connected. If only a single power impulse is desired the said one end of the power spring 32 could be connected to the fixed frame as shown in the first of the prior applications above identified.

Assuming first that the rocker shaft 88 is in the position shown in FIG. 4 and is moving in a clockwise direction, the tongue portion 57 of the pawl 55 is in engagement with one of the teeth 30 of the ratchet wheel 29 and the edge portion 43 of the dog 41 has come out of engagement with the teeth 30 of the ratchet wheel 29 having been so moved by the compressive force of the spring 60 exerted on the spring receiving hook 44 of the dog 41. In this position a force is being applied by the ratchet wheel 29 through the tongue 57, the ratchet frame 45, the driving arm 85 and offset portion 86 of the driving arm 87 while at the same time a counterforce of lesser magnitude is being applied by the spring 32 to the driving frame 35 and therefrom through driving plate 89 and intermediate portion 91 of the driving arm 87.

The ratchet wheel 29 moves in a counterclockwise direction and causes the rocker shaft 88 to move clockwise. Upon reaching its highest point of travel the rocker shaft 88 will move in a counterclockwise direction and the ratchet wheel 29 will move in a clockwise direction. As the rocker shaft 88 travels approximately to the midpoint of its travel (see FIG. 2) in this direction, the spring 60 changes from a condition of compression to a condition of tension. The spring 60 in tension urges the edge 43 of the dog 41 into engagement with a tooth 30 of the ratchet wheel 29. The edge portion 43 of the dog 41 engages the tooth immediately below the tooth it had previously engaged preventing ratchet wheel 29 from rotating, whereupon overtravel of bracket 45 permits tongue 57 to be lifted away from the ratchet wheel 29 by said tension of the spring 60.

As the rocker shaft 88 continues to travel in a counterclockwise direction (see FIG. 5) at this location no force is applied from the ratchet wheel 29 through the ratchet frame 45 to the offset portion 86. A counterclockwise force is, however, applied by the spring 32 through the driving plate 89 and intermediate portion 91 of the driving arm 87, the ratchet frame 45 being reversed in its movement and returning through the condition shown in FIG. 12 to that shown in FIG. 4.

At the condition shown in FIG. 12 the spring 60 has changed from extension to compression, which has moved pawl 57 to the ratchet wheel 29 ready to engage the tooth below the one it previously engaged. As the frame 45 proceeds, the pawl 57 will move the ratchet wheel 29 counterclockwise allowing the spring 60 to disengage the dog 41 and thus arrive at the condition shown in FIG. 4.

The operation of the spring 160 shown in FIGS. 7 and 8 is substantially the same as that of the spring 60. The spring 160 acts in tension to engage the edge 43 of the dog 41 with a tooth 30 of the ratchet wheel 29 while the tongue 57 is being forced out of engagement as shown in FIG. 5. The spring 160 acts in compression to cause the edge 43 to be moved out of engagement with the ratchet wheel 29 while the tongue 57 has been forced into engagement, as shown in FIG. 4. The shape of the spring 160 is such that while acting as an impelling link in compression it bends readily at the central portion thereof for overtravel thereby avoiding undue force application on the dog 41.

The spring 260, shown in FIGS. 9, 9A and 9B, because of the lost motion connection has the head 67 thereof by engagement with the extension 65 acting in tension while in compression the head 67 moves upwardly of the extension 65.

In FIGS. 10 and 11, the connector 70 with its weight 77 acts in place of a spring, the position corresponding to compression being shown in FIG. 11 and the position corresponding to tension being shown in FIG. 10.

The springs 60, 160 and 260 and the connector 70 have the characteristic of imparting motion without changing their effective lengths so long as the force required for movement is less than the initial force thereof. The springs 60, 160 and 260 and the connector 70 are capable of moving the dog 41 and the pawl 55 in either direction without the necessity of first stretching or compressing in order to build up the required force for such movement.

The springs 60, 160 and 260 and the connector 70 thus tend to act as a solid link reducing the lost motion required to build up forces in opposite directions in a normally resilient member in moving the dog 41 and the pawl 55 in either direction and will tend to stretch or compress for the period of over travel of the rocker shaft 88.

I claim:

1. An escapement for pendular devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, a resilient extensible and compressible member connected at one end to said ratchet member and at the other end to said pawl and controlling the respective positioning of said tongues with respect to said ratchet teeth, said resilient member upon extension thereof urging said pawl tongue into engagement with one of said teeth and upon compression thereof urging said pawl to tooth disengaging position.

2. An escapement as defined in claim 1 in which a safety actuating member is provided having a portion on said ratchet wheel spaced from said ratchet teeth and a portion carried by said ratchet member, said portions upon faster than normal movement of said ratchet wheel impelling said ratchet member tongue to a position for engagement with one of said ratchet wheel teeth.

3. An escapement for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, a resilient extensible and compressible member connected at one end to said ratchet member and at the other end to said pawl and controlling the respective positioning of said tongues with respect to said ratchet wheel, said resilient member upon extension thereof urging said pawl tongue into engagement with one of said teeth and upon compression thereof urging said pawl to tooth disengaging position, said resilient member upon extension thereof urging said ratchet tongue out of engagement with one of said teeth and upon compression thereof urging said ratchet tongue into engagement with one of said teeth.

4. An escapement for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, an actuating member connected at one end to said ratchet member and at the other end to said pawl and controlling the respective positioning of said tongues with respect to said ratchet wheel, said actuating member being resiliently bendable between its ends upon compression for moving said pawl tongue in one direction with respect to the ratchet wheel teeth and being extensible for moving said pawl tongue in the opposite direction with respect to said ratchet teeth.

5. An escapment for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, an actuator interposed between said ratchet member and said pawl and controlling the respective positioning of said ratchet member tongue and said pawl tongue with respect to the teeth of said ratchet wheel, said actuator upon tensing thereof urging said pawl tongue into engagement with one of said teeth and upon compressing thereof urging said pawl to tooth disengaging position, and a safety member comprising a portion of said ratchet wheel spaced from said ratchet teeth and a portion carried by said ratchet member, said portions upon faster than normal movement of said ratchet wheel impelling said ratchet member tongue to a position for engagement with one of said ratchet wheel teeth.

6. An escapement for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, and an actuator interposed between said ratchet member and said pawl and controlling the respective positioning of said ratchet member tongue and said pawl tongue with respect to the teeth of said ratchet wheel, said actuator upon tensing thereof urging said pawl tongue into engagement with one of said teeth and upon compressing thereof urging said pawl to tooth disengaging position, said actuator including a coil spring having initial tension and being bendable between its ends upon compression thereof.

7. An escapement for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, and an actuator interposed between said ratchet member and said pawl and controlling the respective positioning of said ratchet member tongue and said pawl tongue with respect to the teeth of said ratchet wheel, said actuator upon tensing thereof urging said pawl tongue into engagement with one of said teeth and upon compressing thereof urging said pawl to tooth disengaging position, said actuator including a coil spring connected at its ends to said ratchet member and to said pawl.

8. An escapement for oscillatory devices comprising a support, a shaft carried in said support, a ratchet wheel on said shaft and having a plurality of teeth, a spring for imparting a rotary motion to said shaft, a ratchet frame carried on said shaft and movable thereon, a ratchet member pivotally mounted on said frame and having a tongue for engagement with said ratchet wheel teeth, a pawl pivotally carried by said support and having a tongue for engagement with said ratchet wheel teeth, an actuator interposed between and connected to said ratchet member and said pawl and controlling the respective positioning of said ratchet member tongue and said pawl tongue with respect to the teeth of said ratchet wheel, said actuator upon tensing thereof urging said pawl tongue into engagement with one of said teeth and upon compressing thereof urging said pawl to tooth disengaging position, and power takeoff mechanism having a pair of members with varying force application in opposite directions, one of said last members having one end of said power spring connected thereto and the other of said last members being connected to said ratchet frame.

9. An escapement mechanism comprising a support, a power spring, a shaft in said support in supporting relation to the power spring and to which said power spring is connected in driving relation, an oscillatory member movably mounted on said shaft, a ratchet wheel secured to said shaft, a first ratchet wheel engaging member pivotally mounted on said support, a second ratchet wheel engaging member pivotally mounted on said oscillatory member, and a resilient member controlling the position of said ratchet wheel engaging members with respect to the teeth of the ratchet wheel interposed between and connected to said ratchet wheel engaging members and acting in tension for engaging one of said ratchet wheel engaging members and at the same time disengaging the other ratchet wheel engaging member and acting in compression for engaging the other of said ratchet wheel engaging members and at the same time disengaging said one ratchet wheel engaging member, and a power takeoff member connected to said ratchet frame for power takeoff in one direction of movement of said ratchet frame.

10. An escapement mechanism comprising a support, a power spring, a shaft in said support in supporting relation to the power spring and to which said power spring is connected in driving relation, an oscillatory member movably mounted on said shaft, a ratchet wheel secured to said shaft, a first ratchet wheel engaging member pivotally mounted on said support, a second ratchet wheel engaging member pivotally mounted on said oscillatory member, and a resilient member controlling the positions of said ratchet wheel engaging members with respect to the teeth of said ratchet wheel interposed between said ratchet wheel engaging members and acting in tension for engaging one of said ratchet wheel engaging members and at the same time disengaging the other ratchet wheel engaging member and acting in compression for engaging the other of said ratchet wheel engaging members and at the same time disengaging said one ratchet wheel engaging member, said resilient member being a coil spring with initial tension and bendable between its ends upon compression thereof.

11. An escapement mechanism comprising a support, a power spring, a shaft in said support in supporting relation to the power spring and to which said power spring is connected in driving relation, an oscillatory member movably mounted on said shaft, a ratchet wheel secured to said shaft, a first ratchet wheel engaging member pivotally mounted on said support, a second ratchet wheel engaging member pivotally mounted on said oscillatory member, and an actuator member controlling the positions of said ratchet wheel engaging members with respect to the teeth of said ratchet wheel interposed between said ratchet wheel engaging members and acting in tension for engaging one of said ratchet wheel engaging members and at the same time disengaging the other ratchet wheel engaging member and acting in compression for engaging the other of said ratchet wheel engaging members and at the same time disengaging said one ratchet wheel engaging member, said actuator member being a coil spring connected at its ends to said ratchet member and to said pawl.

12. An escapement mechanism comprising a support, a power spring, a shaft in said support in supporting relation to the power spring and to which said power spring is connected in driving relation, an oscillatory member movably mounted on said shaft, a ratchet wheel secured to said shaft, a first ratchet wheel engaging member pivotally mounted on said support, a second ratchet wheel engaging member pivotally mounted on said oscillatory member, and an actuator member controlling the positions of said ratchet wheel engaging members with respect to the teeth of said ratchet wheel interposed between said ratchet wheel engaging members and acting in one direction in tension for engaging one of said ratchet wheel engaging members and at the same time disengaging the other ratchet wheel engaging member and acting in the other direction for engaging the other of said ratchet wheel engaging members and at the same time permitting disengaging of said one ratchet wheel engaging member, said actuator member being a coil spring with a lost motion connection at one of its ends.

13. An escapement mechanism comprising a frame, a power spring, a shaft in said frame in supporting relation to the power spring and to which said power spring is connected in driving relation, an oscillatory member movably mounted on said shaft, a ratchet wheel secured to said shaft, a first ratchet wheel engaging member pivotally mounted on said frame, a second ratchet wheel engaging member pivotally mounted on said oscillatory member, and an actuator member controlling the positions of said ratchet wheel engaging members with respect to the teeth of said ratchet wheel interposed between said ratchet wheel engaging members and acting in one direction for engaging one of said ratchet wheel engaging members and at the same time disengaging the other ratchet wheel engaging member and acting in the other direction for engaging the other of said ratchet wheel engaging members and at the same time permitting disengaging of said one ratchet wheel engaging member, said actuator member including a connecting link having a lost motion connection at at least one of its ends.

References Cited in the file of this patent

UNITED STATES PATENTS

| | | |
|---|---|---|
| 579,256 | Bukolt | Mar. 23, 1897 |
| 630,894 | Josefkowicz | Aug. 15, 1899 |
| 1,057,520 | Bednarek | Apr. 1, 1913 |
| 1,342,857 | Magidson | June 8, 1920 |
| 2,559,939 | Carlson | July 10, 1951 |
| 2,860,727 | Pasqua | Nov. 18, 1958 |